United States Patent
Bai et al.

(10) Patent No.: US 11,936,700 B1
(45) Date of Patent: Mar. 19, 2024

(54) VEHICLE VIDEO STREAMING SYSTEM AND METHOD

(71) Applicant: GM Global Technology Operations LLC, Detroit, MI (US)

(72) Inventors: Fan Bai, Ann Arbor, MI (US); Chuan Li, Troy, MI (US); Esther Anderson, Canton, MI (US); Jace C. Stokes, Highland, MI (US); Peter Finnegan, Marietta, GA (US); Tarik Mahmood, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/170,038

(22) Filed: Feb. 16, 2023

(51) Int. Cl.
*H04L 65/61* (2022.01)
*H04N 7/18* (2006.01)

(52) U.S. Cl.
CPC ............. *H04L 65/61* (2022.05); *H04N 7/183* (2013.01)

(58) Field of Classification Search
CPC .................................. H04L 65/61; H04N 7/183
See application file for complete search history.

(56) References Cited

U.S. PATENT DOCUMENTS

| | | | |
|---|---|---|---|
| 11,595,619 B1* | 2/2023 | Gate | H04W 4/024 |
| 2012/0105637 A1* | 5/2012 | Yousefi | H04W 72/56 |
| | | | 348/148 |
| 2017/0150299 A1* | 5/2017 | Coutinho | H04L 1/0076 |
| 2017/0347158 A1* | 11/2017 | Fu | H04N 19/152 |
| 2018/0139585 A1* | 5/2018 | Gholmieh | H04L 65/65 |
| 2018/0297210 A1* | 10/2018 | Peterson | B25J 19/023 |
| 2018/0367731 A1* | 12/2018 | Gatti | H04N 21/4223 |
| 2019/0073539 A1* | 3/2019 | Yu | H04L 65/61 |
| 2019/0253853 A1* | 8/2019 | Makled | H04W 4/029 |
| 2019/0320328 A1* | 10/2019 | Magzimof | H04W 28/0231 |
| 2019/0325667 A1* | 10/2019 | Kim | G07C 5/0866 |
| 2019/0340844 A1* | 11/2019 | Tonshal | G07C 5/0808 |

(Continued)

OTHER PUBLICATIONS

"Cadillac Celestiq Establishes New Standard of Automotive Luxury," Cadillac Pressroom, Oct. 27, 2022, https://media.cadillac.com/media/us/en/cadillac/home.detail.print.html/content/Pages/news/us/en/2022/oct/1017-celestiq.html.

(Continued)

*Primary Examiner* — Blake J Rubin
(74) *Attorney, Agent, or Firm* — Vivacqua Crane, PLLC

(57) ABSTRACT

A system for real-time video streaming for a vehicle includes a camera system configured to capture videos of an environment surrounding the vehicle. The system also includes a vehicle communication system configured to communicate with a remote server and a vehicle controller in electrical communication with the camera system and the vehicle communication system. The vehicle controller is programmed to determine a system enablement state. The vehicle controller is further programmed to determine a camera system configuration in response to determining that the system enablement state is a system enabled state. The vehicle controller is further programmed to capture at least one video frame using the camera system based at least in part on the camera system configuration. The vehicle controller is further programmed to transmit the at least one video frame to the remote server using the vehicle communication system.

20 Claims, 4 Drawing Sheets

(56) References Cited

U.S. PATENT DOCUMENTS

| | | | | |
|---|---|---|---|---|
| 2019/0354111 | A1* | 11/2019 | Cheng | G05D 1/0027 |
| 2019/0355178 | A1* | 11/2019 | Hermina Martinez | H04W 4/40 |
| 2020/0074326 | A1* | 3/2020 | Balakrishnan | G06F 16/583 |
| 2020/0351322 | A1* | 11/2020 | Magzimof | H04L 41/0894 |
| 2021/0109881 | A1* | 4/2021 | Moustafa | B60W 60/001 |
| 2021/0256754 | A1* | 8/2021 | Guo | G06T 15/005 |
| 2022/0137615 | A1* | 5/2022 | Eperjesi | G05D 1/0038 |
| | | | | 701/2 |
| 2022/0161816 | A1* | 5/2022 | Gyllenhammar | G06N 20/00 |
| 2022/0368860 | A1* | 11/2022 | Shinohara | G06V 20/56 |
| 2022/0368972 | A1* | 11/2022 | Cheraghi | H04N 21/4622 |
| 2022/0394283 | A1* | 12/2022 | Cao | H04N 19/136 |
| 2023/0096468 | A1* | 3/2023 | Ong | H04L 47/283 |
| | | | | 370/235 |
| 2023/0269566 | A1* | 8/2023 | Spagnolini | G01S 7/003 |
| | | | | 455/39 |

OTHER PUBLICATIONS

Ahlswede, et al. "Network Information Flow," IEEE Transactions on Information Theory, vol. 46, No. 4, Jul. 2000, pp. 1204-1216.

Byers, et al. "A digital fountain approach to reliable distribution of bulk data," Conference on Applications, Technologies, Architectures, and Protocols for Computer Communication, 1998, pp. 56-67.

Chou, et al. "Practical Network Coding," Microsoft Allerton Conference on Communication, Control, and Computing, Oct. 2003, pp. 1-10.

Lopez, Jonathan. "General Motors Developing Connected Camera Platform," GM Authority Blog, Oct. 11, 2021, https://gmauthority.com/blog/2021/10/general-motors-developing-connected-camera-platform/.

United States Patent and Trademark Office. U.S. Appl. No. 18/150,371, filed Jan. 5, 2023.

United States Patent and Trademark Office. U.S. Appl. No. 18/158,743, filed Jan. 24, 2023.

United States Patent and Trademark Office. U.S. Appl. No. 18/170,060, filed Feb. 16, 2023.

United States Patent and Trademark Office. U.S. Appl. No. 18/170,033, filed Feb. 16, 2023.

* cited by examiner

VEHICLE VIDEO STREAMING SYSTEM AND METHOD

INTRODUCTION

The present disclosure relates to systems and methods for improving occupant awareness for a vehicle, and more particularly to vehicle digital video steaming systems and methods.

To increase occupant awareness and convenience, vehicles may be equipped with digital video streaming systems which are configured to capture images and/or videos of events taking place in an environment surrounding the vehicle. Digital video streaming systems may use at least one camera affixed in/on the vehicle to monitor for events and capture images/videos. Digital video streaming systems may transmit video streams to external systems using a network connection. However, network connection quality may vary due to multiple factors, for example, location of the vehicle relative to network infrastructure, weather conditions, network congestion, and the like. Variations in network connection quality can lead to lost data, and thus corrupted video streams. Digital video streaming systems may re-transmit lost data to compensate for variations in network connection quality. However, re-transmission of lost data leads to increased bandwidth use and processing overhead.

Thus, while current digital video streaming systems and methods achieve their intended purpose, there is a need for a new and improved system and method for digital video streaming for a vehicle.

SUMMARY

According to several aspects, a system for real-time video streaming for a vehicle is provided. The system includes a camera system configured to capture videos of an environment surrounding the vehicle. The system also includes a vehicle communication system configured to communicate with a remote server. The system also includes a vehicle controller in electrical communication with the camera system and the vehicle communication system. The vehicle controller is programmed to determine a system enablement state. The system enablement state includes a system enabled state and a system disabled state. The vehicle controller is further programmed to determine a camera system configuration in response to determining that the system enablement state is the system enabled state. The vehicle controller is further programmed to capture at least one video frame using the camera system based at least in part on the camera system configuration. The vehicle controller is further programmed to transmit the at least one video frame to the remote server using the vehicle communication system.

In another aspect of the present disclosure, to determine the system enablement state, the vehicle controller is further programmed to identify an application mode of the system. To determine the system enablement state, the vehicle controller is further programmed to determine at least one context. To determine the system enablement state, the vehicle controller is further programmed to determine the system enablement state based at least in part on the application mode and the at least one context.

In another aspect of the present disclosure, the plurality of vehicle sensors is in electrical communication with the vehicle controller. To determine the at least one context, the vehicle controller is further programmed to retrieve mobile device context data from a mobile device using the vehicle communication system. To determine the at least one context, the vehicle controller is further programmed to retrieve remote server context data from the remote server using the vehicle communication system. To determine the at least one context, the vehicle controller is further programmed to retrieve vehicle sensor data from the plurality of vehicle sensors. To determine the at least one context, the vehicle controller is further programmed to determine an occupant context based at least in part on the mobile device context data, the remote server context data, and the vehicle sensor data. To determine the at least one context, the vehicle controller is further programmed to determine a vehicle context based at least in part on the mobile device context data, the remote server context data, and the vehicle sensor data. To determine the at least one context, the vehicle controller is further programmed to determine an environment context based at least in part on the mobile device context data, the remote server context data, and the vehicle sensor data.

In another aspect of the present disclosure, to determine the system enablement state, the vehicle controller is further programmed to determine the system enablement state using an enablement state lookup table. The enablement state lookup table maps the at least one context to the system enablement state.

In another aspect of the present disclosure, to determine the camera system configuration, the vehicle controller is further programmed to determine an available bandwidth of a connection to the remote server using the vehicle communication system. To determine the camera system configuration, the vehicle controller is further programmed to and determine the camera system configuration based at least in part on the available bandwidth and the application mode of the system. The camera system configuration includes a selected camera, a camera resolution, a camera frame rate, and a camera compression rate.

In another aspect of the present disclosure, to transmit the at least one video frame, the vehicle controller is further programmed to encapsulate the at least one video frame in at least one original packet block. The at least one original packet block includes a plurality of packets. To transmit the at least one video frame, the vehicle controller is further programmed to generate at least one encoded packet based on the plurality of packets in the at least one original packet block. The at least one encoded packet is generated using network coding. To transmit the at least one video frame, the vehicle controller is further programmed to generate at least one encoded packet block. The encoded packet block is a concatenation of the at least one original packet block and the at least one encoded packet. To transmit the at least one video frame, the vehicle controller is further programmed to transmit the at least one encoded packet block to the remote server using the vehicle communication system.

In another aspect of the present disclosure, to generate the at least one encoded packet, the vehicle controller is further programmed to determine an importance level of the at least one video frame. To generate the at least one encoded packet, the vehicle controller is further programmed to determine a quantity of encoded packets to generate based at least in part on the importance level of the at least one video frame. To generate the at least one encoded packet, the vehicle controller is further programmed to generate the quantity of encoded packets based on the plurality of packets in the at least one original packet block. The quantity of encoded packets is generated using network coding.

In another aspect of the present disclosure, to determine the quantity of encoded packets to generate, the vehicle controller is further programmed to determine a connection quality of a connection to the remote server using the vehicle communication system. To determine the quantity of encoded packets to generate, the vehicle controller is further programmed to determine the quantity of encoded packets to generate based at least in part on the importance level of the at least one video frame and the connection quality.

In another aspect of the present disclosure, the at least one video frame includes at least two groups of pictures. A first group of pictures of the at least two groups of pictures includes a first plurality of frames. A second group of pictures of the at least two groups of pictures includes a second plurality of frames. To encapsulate the at least one video frame, the vehicle controller is further programmed to generate a plurality of original packet blocks. Each of the plurality of original packet blocks includes at least one of the first plurality of frames and at least one of the second plurality of frames.

In another aspect of the present disclosure, each of the first plurality of frames and second plurality of frames includes an intra frame and at least one inter frame. To generate the plurality of original packet blocks, the vehicle controller is further programmed to generate a first plurality of packets. The first plurality of packets encapsulates the first plurality of frames. To generate the plurality of original packet blocks, the vehicle controller is further programmed to generate a second plurality of packets. The second plurality of packets encapsulates the intra frame of the second plurality of frames. To generate the plurality of original packet blocks, the vehicle controller is further programmed to generate the plurality of original packet blocks, where each of the plurality of original packet blocks includes at least one of the first plurality of packets and at least one of the second plurality of packets.

According to several aspects, a method for real-time video streaming for a vehicle is provided. The method includes determining a system enablement state. The system enablement state includes a system enabled state and a system disabled state. The method also includes determining a camera system configuration in response to determining that the system enablement state is the system enabled state. The method also includes capturing at least one video frame using a camera system based at least in part on the camera system configuration. The method also includes transmitting the at least one video frame to a remote server using a vehicle communication system.

In another aspect of the present disclosure, determining the system enablement state further may include identifying an application mode of the system. Determining the system enablement state further may include retrieving mobile device context data from a mobile device using the vehicle communication system. Determining the system enablement state further may include retrieving remote server context data from the remote server using the vehicle communication system. Determining the system enablement state further may include retrieving vehicle sensor data from a plurality of vehicle sensors. Determining the system enablement state further may include determining an occupant context based at least in part on the mobile device context data, the remote server context data, and the vehicle sensor data. Determining the system enablement state further may include determining a vehicle context based at least in part on the mobile device context data, the remote server context data, and the vehicle sensor data. Determining the system enablement state further may include determining an environment context based at least in part on the mobile device context data, the remote server context data, and the vehicle sensor data. Determining the system enablement state further may include determining the system enablement state based at least in part on the application mode, the occupant context, the vehicle context, and the environment context.

In another aspect of the present disclosure, determining the system enablement state further may include determining the system enablement state using an enablement state lookup table. The enablement state lookup table maps the application mode, the occupant context, the vehicle context, and the environment context to the system enablement state.

In another aspect of the present disclosure, determining the camera system configuration further may include determining an available bandwidth of a connection to the remote server using the vehicle communication system. Determining the camera system configuration further may include determining the camera system configuration based at least in part on the available bandwidth and the application mode of the system. The camera system configuration includes a selected camera, a camera resolution, a camera frame rate, and a camera compression rate.

In another aspect of the present disclosure, transmitting the at least one video frame further may include encapsulating the at least one video frame in at least one original packet block. The at least one original packet block includes a plurality of packets. Transmitting the at least one video frame further may include generating at least one encoded packet based on the plurality of packets in the at least one original packet block. The at least one encoded packet is generated using network coding. Transmitting the at least one video frame further may include generating at least one encoded packet block. The encoded packet block is a concatenation of the at least one original packet block and the at least one encoded packet. Transmitting the at least one video frame further may include transmitting the at least one encoded packet block to the remote server using the vehicle communication system.

In another aspect of the present disclosure, generating at least one encoded packet further may include determining an importance level of the at least one video frame. Generating at least one encoded packet further may include determining a connection quality of a connection to the remote server using the vehicle communication system. Generating at least one encoded packet further may include determining a quantity of encoded packets to generate based at least in part on the importance level of the at least one video frame and the connection quality. Generating at least one encoded packet further may include generating the quantity of encoded packets based on the plurality of packets in the original packet block. The quantity of encoded packets is generated using network coding.

In another aspect of the present disclosure, the at least one video frame includes at least two groups of pictures. A first group of pictures of the at least two groups of pictures includes a first plurality of frames. A second group of pictures of the at least two groups of pictures includes a second plurality of frames. Each of the first plurality of frames and second plurality of frames includes an intra frame and at least one inter frame. Encapsulating the at least one video frame further may include generating a first plurality of packets. The first plurality of packets encapsulates the first plurality of frames. Encapsulating the at least one video frame further may include generating a second plurality of packets. The second plurality of packets encapsulates the intra frame of the second plurality of frames. Encapsulating the at least one video frame further may include generating a plurality of original packet blocks. Each of the plurality of original packet blocks includes at least one of the first plurality of packets and at least one of the second plurality of packets.

According to several aspects, a system for real-time video streaming for a vehicle is provided. The system includes a camera system configured to capture videos of an environment surrounding the vehicle. The system also includes a vehicle communication system configured to communicate with a remote server. The system also includes a vehicle controller in electrical communication with the camera system and the vehicle communication system. The vehicle controller is programmed to determine a system enablement state using an enablement state lookup table. The enablement state lookup table maps an application mode of the system, an occupant context, a vehicle context, and an environment context to the system enablement state. The system enablement state includes a system enabled state and a system disabled state. The vehicle controller is further programmed to determine a connection quality of a connection to the remote server using the vehicle communication system. The vehicle controller is further programmed to determine a camera system configuration in response to determining that the system enablement state is the system enabled state. The camera system configuration is based at least in part on the connection quality and the application mode of the system. The camera system configuration includes a selected camera, a camera resolution, a camera frame rate, and a camera compression rate. The vehicle controller is further programmed to capture at least one video frame using the camera system based at least in part on the camera system configuration. The vehicle controller is further programmed to encapsulate the at least one video frame in at least one original packet block. The at least one original packet block includes a plurality of packets. The vehicle controller is further programmed to generate at least one encoded packet block. The at least one encoded packet block is a concatenation of the at least one original packet block and a quantity of encoded packets generated using network coding. The vehicle controller is further programmed to transmit the at least one encoded packet block to the remote server using the vehicle communication system.

In another aspect of the present disclosure, the quantity of encoded packets to be generated is determined based at least in part on an importance level of the at least one video frame and the connection quality of the connection to the remote server.

In another aspect of the present disclosure, the at least one video frame includes at least two groups of pictures. A first group of pictures of the at least two groups of pictures includes a first plurality of frames. A second group of pictures of the at least two groups of pictures includes a second plurality of frames. Each of the first plurality of frames and second plurality of frames includes an intra frame and at least one inter frame. To encapsulate the at least one video frame, the vehicle controller is further programmed to generate a first plurality of packets. The first plurality of packets encapsulates the first plurality of frames. To encapsulate the at least one video frame, the vehicle controller is further programmed to generate a second plurality of packets. The second plurality of packets encapsulates the intra frame of the second plurality of frames. To encapsulate the at least one video frame, the vehicle controller is further programmed to generate a plurality of original packet blocks. Each of the plurality of original packet blocks includes at least one of the first plurality of packets and at least one of the second plurality of packets.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Real-time video streaming for vehicles is useful for various applications. However, streaming data in real-time over a network connection presents challenges due to variability in network connection quality and performance. In some cases, data may be lost due to packet loss, which is when a data packet traveling over a network fails to reach the intended destination. By using adaptive network coding to dynamically implement forward error correction, the effects of packet loss may be efficiently mitigated.

Figure 1:
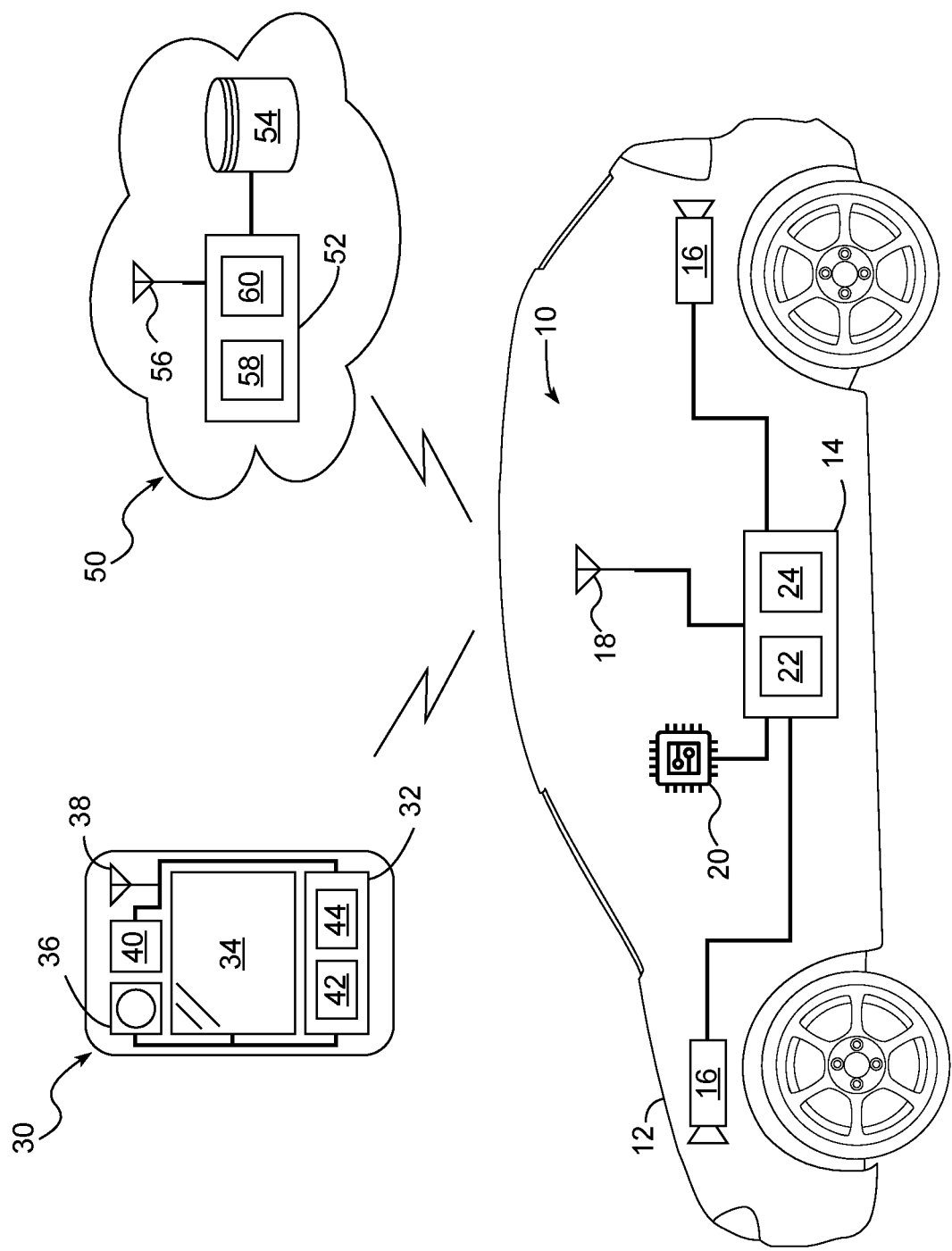
FIG. 1 is a schematic diagram of a system for real-time video streaming for a vehicle, according to an exemplary embodiment.

Referring to FIG. 1, a system for real-time video streaming for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a camera system 16, a vehicle communication system 18, and a plurality of vehicle sensors 20.

The vehicle controller 14 is used to implement a method 100 for real-time video streaming for a vehicle, as will be described below. The vehicle controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions. The computer readable storage device or media 24 may include volatile and nonvolatile storage in read-only memory (ROM), random-access memory (RAM), and keep-alive memory (KAM), for example. KAM is a persistent or nonvolatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the camera system 16, the vehicle communication system 18, and the plurality of vehicle sensors 20. In an exemplary embodiment, the electrical communication is established using, for example, a CAN bus, a Wi-Fi network, a cellular data network, or the like. It should be understood that various additional wired and wireless techniques and communication protocols for communicating with the vehicle controller 14 are within the scope of the present disclosure.

The camera system 16 is used to capture images and/or videos of the environment surrounding the vehicle 12. In an exemplary embodiment, the camera system 16 includes a photo and/or video camera which is positioned to view the environment surrounding of the vehicle 12. In a non-limiting example, the camera system 16 includes cameras affixed inside of the vehicle 12, for example, in a headliner of the vehicle 12, having a view through the windscreen. In another non-limiting example, the camera system 16 includes cameras affixed outside of the vehicle 12, for example, on a roof of the vehicle 12, having a view of the environment in front of the vehicle 12.

In another exemplary embodiment, the camera system 16 is a surround view camera system including a plurality of cameras (also known as satellite cameras) arranged to provide a view of the environment adjacent to all sides of the vehicle 12. In a non-limiting example, the camera system 16 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 16 further includes an additional rear-view camera mounted near a center high mounted stop lamp of the vehicle 12. In yet another exemplary embodiment, the camera system 16 further includes at least one interior camera configured to view an interior of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The camera system 16 is in electrical communication with the vehicle controller 14 as discussed above.

The vehicle communication system 18 is used by the vehicle controller 14 to communicate with other systems external to the vehicle 12. For example, the vehicle communication system 18 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 18 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 18 may include one or more antennas and/or communication transceivers for receiving and/or transmitting signals, such as cooperative sensing messages (CSMs). The vehicle communication system 18 is configured to wirelessly communicate information between the vehicle 12 and another vehicle. Further, the vehicle communication system 18 is configured to wirelessly communicate information between the vehicle 12 and infrastructure or other vehicles. The vehicle communication system 18 is in electrical communication with the vehicle controller 14 as discussed above.

The plurality of vehicle sensors 20 are used to determine information about states of systems and/or components of the vehicle 12. In an exemplary embodiment, the plurality of vehicle sensors 20 includes at least one of a latch sensor (e.g., door, hood, trunk, and roof ajar sensors), a glass breakage sensor, an intrusion sensor (e.g., an ultrasonic sensor for detecting motion in an interior of the vehicle 12), an inertial measurement unit (IMU), and/or an inclination sensor (i.e., for detecting an angle of the vehicle 12). The plurality of vehicle sensors 20 further includes connections to additional vehicle systems, such as, for example, the vehicle communication system 18 (e.g., to identify whether an antenna of the vehicle has been disconnected), a vehicle charging system (e.g., to detect a change in charging state), and/or the like. It should be understood that, within the scope of the present disclosure, the plurality of vehicle sensors 20 includes any sensors, actuators, and/or electromechanical components of the vehicle 12 which may be controlled, configured, and/or measured by the vehicle controller 14 to determine a state of a component and/or system of the vehicle 12.

In another exemplary embodiment, the plurality of vehicle sensors 20 further includes environmental sensors used to determine information about an environment surrounding the vehicle 12, for example, an ambient air temperature sensor, a barometric pressure sensor, and/or the like.

In yet another exemplary embodiment, the plurality of vehicle sensors 20 further includes a global navigation satellite system (GNSS). The GNSS is used to determine a geographical location of the vehicle 12. In an exemplary embodiment, the GNSS is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS. It should be understood that various additional types of satellite-based radionavigation systems, such as, for example, the Global Positioning System (GPS), Galileo, GLONASS, and the BeiDou Navigation Satellite System (BDS) are within the scope of the present disclosure. The plurality of vehicle sensors 20 is in electrical communication with the vehicle controller 14 as discussed above.

With continued reference to FIG. 1, a mobile device 30 is in wireless communication with the system 10. While the mobile device 30 is depicted as a smartphone in FIG. 1, it should be understood that additional mobile devices, such as, for example, tablets, fitness trackers, smart wearable devices, and the like are within the scope of the present disclosure.

The mobile device 30 is used to determine context data, as will be discussed in further detail below. The mobile device 30 includes a mobile device controller 32, a mobile device display 34, a mobile device camera 36, a mobile device communication system 38, and mobile device sensors 40. Each of the mobile device display 34, the mobile device camera 36, the mobile device communication system 38, and the mobile device sensors 40 are in electrical communication with the mobile device controller 32.

The mobile device controller 32 controls the operation of the mobile device 30. The mobile device controller 32 includes at least one mobile device processor 42 and a mobile device non-transitory computer readable storage device or media 44. In a non-limiting example, the mobile device processor 42 and mobile device media 44 of the mobile device controller 32 are similar in structure and/or function to the processor 22 and the media 24 of the vehicle controller 14, as described above.

The mobile device display 34 is used to display information to the occupant. The mobile device display 34 is capable of displaying text, graphics, and/or images. It should be understood that the mobile device display 34 may include an LCD display, LED display, and/or the like without departing from the scope of the present disclosure.

The mobile device camera 36 is used to capture images of an environment surrounding the mobile device 30. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The mobile device communication system 38 allows the mobile device controller 32 to communicate with remote systems. In an exemplary embodiment, the mobile device communication system 38 includes a wireless communication system configured to communicate using wireless networks such as a wireless local area network (WLAN) using IEEE 802.11 standards and/or using cellular data communication. Accordingly, in a non-limiting example, the mobile device communication system 38 includes one or more antennas and/or communication transceivers for transmitting and/or receiving signals.

The mobile device sensors 40 are used to monitor the environment surrounding the mobile device 30. In an exemplary embodiment, the mobile device sensors 40 include motion sensors, such as, for example, an accelerometer, a gyroscope, a magnetometer, a temperature sensor, a pressure sensor, and the like. In another exemplary embodiment, the mobile device sensors 40 further include user health sensors, such as, for example, a heart rate sensor, a blood oxygen sensor, a body temperature sensor, and the like. In another exemplary embodiment, the mobile device sensors 40 further include a GNSS having similar structure and function to the GNSS of the vehicle sensors 20, as discussed above. In a non-limiting example, the mobile device sensors 40 are used by the mobile device controller 32 to gather data about a user of the mobile device 30 (i.e., the occupant of the vehicle 12), referred to as mobile device context data.

With continued reference to FIG. 1, a remote server system is illustrated and generally indicated by reference number 50. The remote server system 50 includes a server controller 52 in electrical communication with a server database 54 and a server communication system 56. In a non-limiting example, the remote server system 50 is located in a server farm, datacenter, or the like, and connected to the internet. The server controller 52 includes at least one server processor 58 and a server non-transitory computer readable storage device or server media 60. The description of the type and configuration given above for the vehicle controller 14 also applies to the server controller 52. The description given above for the vehicle communication system 18 also applies to the server communication system 56. The server communication system 56 is used to communicate with external systems, such as, for example, the vehicle controller 14 via the vehicle communication system 18. In a non-limiting example, the remote server system 50 includes and/or has access to information about the environment surrounding the vehicle 12 and/or about the occupant (e.g., weather information, points-of-interest, local event information, occupant location history, and/or the like), referred to herein as remote server context data.

Figure 2:
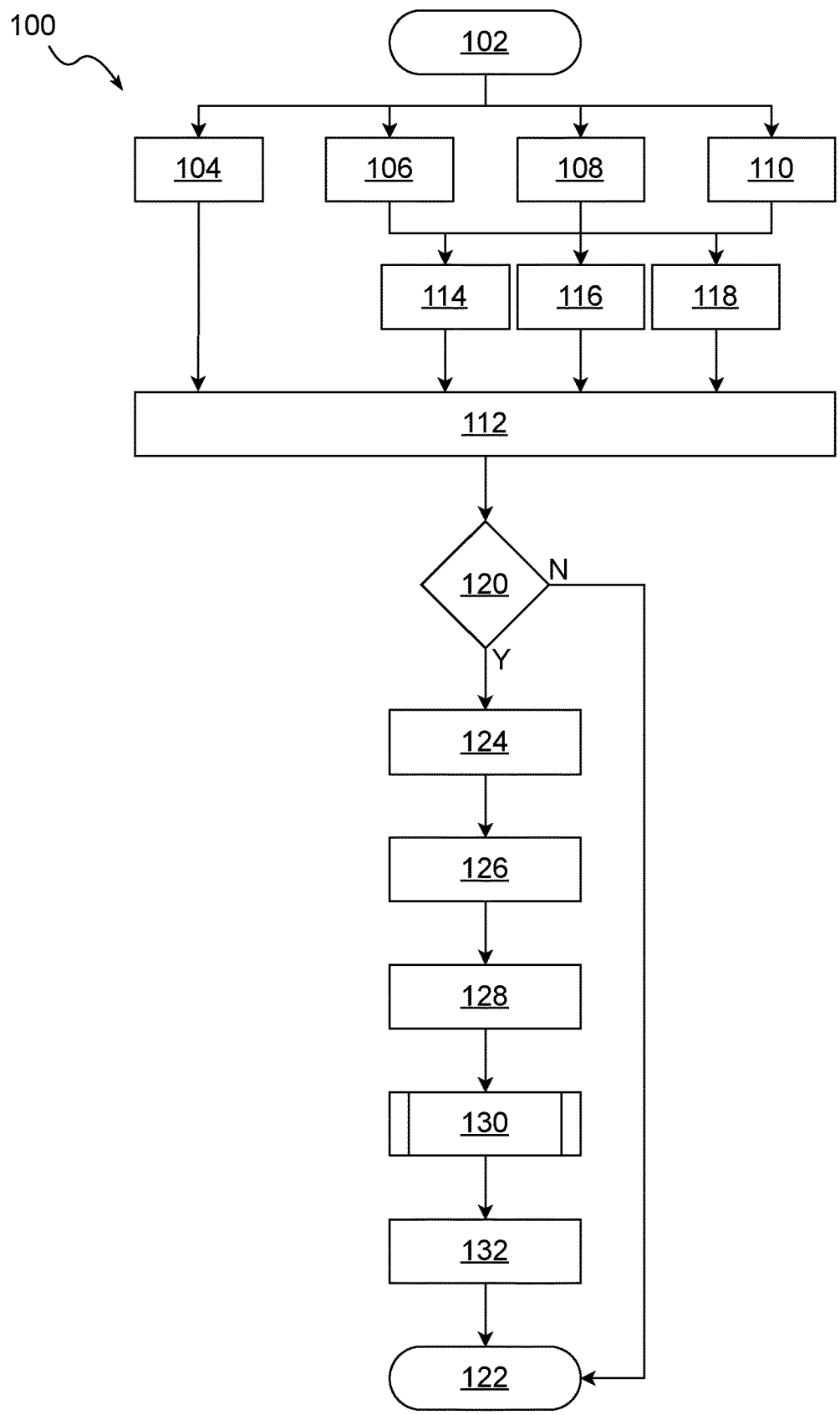
FIG. 2 is a flowchart of a method for real-time video streaming for a vehicle, according to an exemplary embodiment.

Referring to FIG. 2, a flowchart of the method 100 for real-time video streaming for a vehicle is shown. The method 100 begins at block 102 and proceeds to blocks 104, 106, 108, and 110. At block 104, the vehicle controller 14 identifies an application mode of the system. In the scope of the present disclosure, the application mode identifies a use-case of the system 10. In an exemplary embodiment, the application mode includes one of: a teleconference application, a theft-prevention application, or a support application.

The teleconference application is used to enable the occupant to participate in an audio and/or video conference using the system 10. The theft-prevention application is used to prevent theft, vandalism, and other types of intentional or unintentional damage to the vehicle 12. The support application is used to remotely provide assistance to the occupant using the system 10 (e.g., using ON-STAR by GENERAL MOTORS). The application mode is used to determine characteristics of the operation of the system 10, as will be discussed in further detail below. In a non-limiting example, the application mode is determined by the receipt of an input from the occupant of the vehicle 12, using, for example, a human-interface device (e.g., a touchscreen, an electromechanical button, and/or the like). In another non-limiting example, the application mode is determined based on a determination of the environmental conditions, such as, for example, a time of day, a location of the vehicle 12, an enablement state of an alarm system of the vehicle 12, and/or the like. It should be understood that various additional application modes and methods for determining application modes are within the scope of the present disclosure. After block 104, the method 100 proceeds to block 112.

At block 106, the vehicle controller 14 uses the vehicle communication system 18 to retrieve the mobile device context data from the mobile device 30. In the scope of the present disclosure, the mobile device context data includes data gathered by the mobile device sensors 40, as discussed above. In an exemplary embodiment, the vehicle controller 14 uses the vehicle communication system 18 to establish a connection with the mobile device 30, request the mobile device context data, and receive the mobile device context data. After block 106, the method 100 proceeds to blocks 114, 116, and 118.

At block 108, the vehicle controller 14 uses the vehicle communication system 18 to retrieve the remote server context data from the remote server system 50. In the scope of the present disclosure, the remote server context data includes information about the environment surrounding the vehicle 12 and/or about the occupant (e.g., weather information, points-of-interest, local event information, occupant location history, and/or the like), as discussed above. In an exemplary embodiment, the vehicle controller 14 uses the vehicle communication system 18 to establish a connection with the remote server system 50, request the remote server context data, and receive the remote server context data. After block 108, the method 100 proceeds to blocks 114, 116, and 118.

At block 110, the vehicle controller 14 retrieves vehicle sensor data from the plurality of vehicle sensors 20. In the scope of the present disclosure, the vehicle sensor data includes information about states of systems and/or components of the vehicle 12, as discussed above. After block 110, the method 100 proceeds to blocks 114, 116, and 118.

At block 114, the vehicle controller 14 determines an occupant context based at least in part on the mobile device context data retrieved at block 106, the remote server context data retrieved at block 108, and the vehicle sensor data retrieved at block 110. In the scope of the present disclosure, the occupant context includes information about the occupant. In a non-limiting example, the occupant context includes a location of the occupant relative to the vehicle 12 (i.e., whether the occupant is present within a predetermined proximity of the vehicle 12, for example, ten meters). In an exemplary embodiment, the occupant context is determined based on at least one of: the mobile device context data retrieved at block 106, the remote server context data retrieved at block 108, and the vehicle sensor data retrieved at block 110. For example, the vehicle sensor data may show that the vehicle 12 is locked and a security system of the vehicle is armed. Additionally, the mobile device context data may show that the occupant's location is not in the vicinity of the vehicle 12. Therefore, in the aforementioned example, the occupant context includes that the occupant is not present near the vehicle 12. After block 114, the method 100 proceeds to block 112.

At block 116, the vehicle controller 14 determines a vehicle context based at least in part on the mobile device context data retrieved at block 106, the remote server context data retrieved at block 108, and the vehicle sensor data retrieved at block 110. In the scope of the present disclosure, the vehicle context includes information about the vehicle 12. In a non-limiting example, the vehicle context includes information about states of systems and/or components of the vehicle 12 (e.g., a location of the vehicle 12, a parking status of the vehicle 12, and/or information about surroundings of the vehicle 12). In an exemplary embodiment, the vehicle context is determined based on at least one of: the mobile device context data retrieved at block 106, the remote server context data retrieved at block 108, and the vehicle sensor data retrieved at block 110. For example, the vehicle sensor data may show that the vehicle 12 is locked and a security system of the vehicle is armed. Additionally, the mobile device context data may show that the occupant's location is not in the vicinity of the vehicle 12. Furthermore, the remote server context data may show that a location of the vehicle 12 is in a parking garage. Therefore, in the aforementioned example, the vehicle context includes that the vehicle 12 is parked in a parking garage. After block 116, the method 100 proceeds to block 112.

At block 118, the vehicle controller 14 determines an environment context based at least in part on the mobile device context data retrieved at block 106, the remote server context data retrieved at block 108, and the vehicle sensor data retrieved at block 110. In the scope of the present disclosure, the environment context includes information about the environment surrounding the vehicle 12. In a non-limiting example, the environment context includes weather information (e.g., temperature, visibility, and the like), road condition information (e.g., road closures, road surface condition, and the like), traffic information, and/or the like. In an exemplary embodiment, the environment context is determined based on at least one of: the mobile device context data retrieved at block 106, the remote server context data retrieved at block 108, and the vehicle sensor data retrieved at block 110. For example, the vehicle sensor data may show that the vehicle 12 is moving slowly. Additionally, the remote server context data may show that traffic is expected in the vicinity of the vehicle 12. Therefore, in the aforementioned example, the environmental context includes that the vehicle 12 is driving in a traffic congestion situation. After block 118, the method 100 proceeds to block 112.

At block 112, the vehicle controller 14 determines a system enablement state. In the scope of the present disclosure, the system enablement state includes either a system enabled state or a system disabled state. The system enablement state determines whether the system 10 is enabled. In an exemplary embodiment, the system enablement state is determined based at least in part on the application mode determined at block 104, the occupant context determined at block 114, the vehicle context determined at block 116, and the environment context determined at block 118. In a non-limiting example, the system enablement state is determined using a multidimensional enablement state lookup table (LUT) which maps the application mode, the occupant context, the vehicle context, and the environment context to the system enablement state. The LUT has four key columns (i.e., one key column for each of the application mode, the occupant context, the vehicle context, and the environment context) and one value column (i.e., one value column for the system enablement state). In an exemplary embodiment, the LUT includes a plurality of rows, each of the plurality of rows mapping a unique combination of the application mode, the occupant context, the vehicle context, and the environment context in the four key columns to a value in the value column (i.e., the system enabled state or the system disabled state). The LUT is stored in the media 24 of the vehicle controller 14. In an exemplary embodiment, the plurality of rows of the LUT are predetermined. In another exemplary embodiment, the plurality of rows of the LUT may be modified by the occupant, using, for example, a human-interface device. In yet another exemplary embodiment, the plurality of rows of the LUT may be updated over-the-air (OTA) using the vehicle communication system 18. It should be understood that any method (e.g., programmatic data structure, logic equation, mathematical function, and/or the like) of mapping a plurality of keys (i.e., the application mode, the occupant context, the vehicle context, and the environment context) to a plurality of values (i.e., the system enabled state or the system disabled state) is within the scope of the present disclosure. After block 112, the method 100 proceeds to block 120.

At block 120, if the system enablement state was determined to be the system disabled state at block 112, the method 100 proceeds to enter a standby state at block 122. If the system enablement state was determined to be the system enabled state at block 112, the method 100 proceeds block 124.

At block 124, the vehicle controller 14 determines an available bandwidth of a connection between the vehicle communication system 18 of the system 10 and the server communication system 56 of the remote server system 50. In an exemplary embodiment, to determine the available bandwidth of the connection, the vehicle controller 14 transfers a predetermined amount of data over the connection and measuring a transfer time required to transfer the predetermined amount of data. In a non-limiting example, the bandwidth is measured in megabits-per-second (e.g., 10 megabits-per-second). After block 124, the method 100 proceeds to block 126.

At block 126, the vehicle controller 14 determines a camera system configuration of the camera system 16. In the scope of the present disclosure, the camera system configuration includes a selected camera of the plurality of cameras of the camera system 16 (e.g., the front-facing camera), a camera resolution (e.g., 1080p), a camera frame rate (e.g., 30 frames-per-second), and a camera compression rate (e.g., 1:20). It should be understood that the camera system configuration may include additional information relating to an operation of the camera system 16 within the scope of the present disclosure. In an exemplary embodiment, the camera system configuration is determined based at least in part on the application mode determined at block 104 and the available bandwidth determined at block 124. In a non-limiting example, if the application mode is the teleconference application, the selected camera is the at least one interior camera of the camera system 16. The camera resolution, camera frame rate, and camera compression rate are determined based on the available bandwidth determined at block 124. In a non-limiting example, if the available bandwidth is below a predetermined bandwidth threshold (e.g., 5 megabits-per-second), the camera resolution, camera frame rate, and camera compression rate are configured to prevent exceeding the available bandwidth during streaming (e.g., by lowering the camera resolution and camera frame rate and increasing the camera compression rate). After block 126, the method 100 proceeds to block 128.

At block 128, the vehicle controller 14 captures at least one video frame using the camera system 16. The characteristics of the at least one video frame are determined, at least in part, based on the camera system configuration determined at block 126. In an exemplary embodiment, the at least one video frame is temporarily buffered using a camera buffer of the camera system 16 and/or the media 24 of the vehicle controller 14 during further execution of the method 100. In another exemplary embodiment, the at least one video frame is stored in a non-transient memory, such as, for example, a hard-disk drive, a solid-state drive, and/or the like for later retrieval. After block 128, the method 100 proceeds to block 130.

At block 130, the vehicle controller 14 prepares the at least one video frame captured at block 128 for transmission using adaptive network coding, as will be discussed in further detail in reference to FIGS. 3 and 4 below. After block 130, the method 100 proceeds to block 132.

At block 132, the vehicle controller 14 uses the vehicle communication system 18 to transmit the at least one video frame prepared at block 130 to the remote server system 50 for reception using the server communication system 56. After block 132, the method 100 proceeds to enter the standby state at block 122.

In an exemplary embodiment, the controller 14 repeatedly exits the standby state 122 and restarts the method 100 at block 102. In a non-limiting example, the controller 14 exits the standby state 122 and restarts the method 100 on a timer, for example, every three hundred milliseconds.

Figure 3:
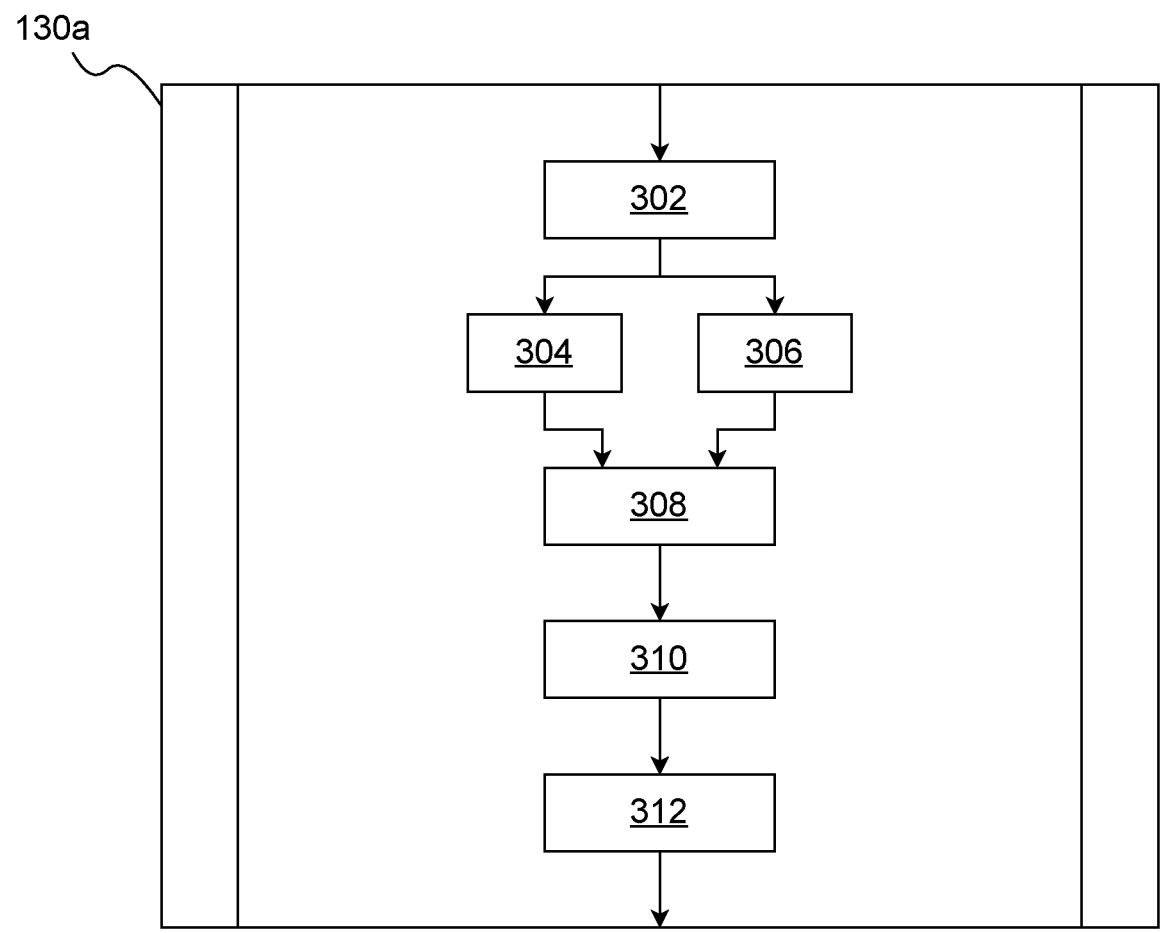
FIG. 3 is a flowchart of a method for adaptive network coding according to a first exemplary embodiment.

Referring to FIG. 3, a flowchart of a first exemplary embodiment 130a of block 130 is shown. For purposes of explanation, the first exemplary embodiment 130a will be described in reference to a single one of the at least one video frame captured at block 128. It should be understood, however, that the first exemplary embodiment 130a may be performed with an arbitrary number of video frames without departing from the scope of the present disclosure. The first exemplary embodiment 130a begins at block 302.

At block 302, the vehicle controller 14 encapsulates the video frame captured at block 128 into an original packet block. In the scope of the present disclosure, the original packet block is a group of network packets (also referred to herein as "packets") containing data for the video frame captured at block 128. In the scope of the present disclosure, a network packet is a unit of data carried by a network connection. In a non-limiting example, the network packet includes a header with metadata and a payload with data to be transferred using the network connection. In an exemplary embodiment, the data defining the video frame captured at block 128 is divided into a plurality of sections, each of the plurality of sections being the payload of one of a plurality of packets. The plurality of packets containing all of the data defining the video frame captured at block 128 is referred to as the original packet block. After block 302, the first exemplary embodiment 130a proceeds to blocks 304 and 306.

At block 304, the vehicle controller 14 determines an importance level of the video frame encapsulated at block 302. In an exemplary embodiment, the importance level is based, at least in part, on a frame type of the video frame, as determined during an encoding process. In the scope of the present disclosure, the frame type of the video frame is one of an intra frame (also referred to as an "I-frame") or an inter frame (also referred to as a "P-frame" or a "B-frame"). In a non-limiting example, intra frames are determined to have a highest importance level, because they include data for a complete image. Inter frames are determined to have a relatively lower importance level, because inter frames include only differences between previous and/or subsequent frames. After block 304, the first exemplary embodiment 130a proceeds to block 308.

At block 306, the vehicle controller 14 uses the vehicle communication system 18 to determine a connection quality of the connection between the vehicle communication system 18 of the system 10 and the server communication system 56 of the remote server system 50. In an exemplary embodiment, the connection quality is determined based on at least one of the following metrics: connection throughput/speed, connection bandwidth, packet drop rate, received signal strength indicator (RSSI), reference signal received power (RSRP), and the like. In a non-limiting example, the connection quality is a weighted average of normalized values of each of the aforementioned metrics. After block 306, the first exemplary embodiment 130a proceeds to block 308.

At block 308, the vehicle controller 14 determines a quantity of encoded packets to generate based at least in part on the importance level determined at block 304 and the connection quality determined at block 306. In the scope of the present disclosure, encoded packets are additional packets which are generated based on the original packet block defined at block 302 to increase a reliability of transmission of the data in the original packet block. In a non-limiting example, the reliability of transmission of the data in the original packet block is proportional to the quantity of encoded packets generated. In an exemplary embodiment, the quantity of encoded packets to generate is determined based on the importance level determined at block 304 and the connection quality determined at block 306.

In a non-limiting example, if the video frame encapsulated in the original packet block is determined to have a high importance level at block 304, the quantity of encoded packets to generate is determined to be higher. If the video frame encapsulated in the original packet block is determined to have a low importance level at block 304, the quantity of encoded packets to generate is determined to be lower. If the connection quality determined at block 306 is low, the quantity of encoded packets to generate is determined to be higher. If the connection quality determined at block 306 is high, the quantity of encoded packets to generate is determined to be lower.

In other words, the quantity of encoded packets to generate is positively correlated with the importance level of the video frame and negatively correlated with the connection quality. For example, if the connection quality is low and the importance level is high, the quantity of encoded packets to generate is determined to be ten encoded packets. In another example, if the connection quality is high and the importance level is low, the quantity of encoded packets to generate is determined to be two encoded packets. It should be understood that various additional relationships between the importance level, connection quality, and quantity of encoded packets to generate are within the scope of the present disclosure. After block 308, the first exemplary embodiment 130a proceeds to block 310.

At block 310, the vehicle controller 14 generates at least one encoded packet based on the quantity of encoded packets to generate determined at block 308. In an exemplary embodiment, each of the at least one encoded packets is generated by performing a mathematical operation (e.g., a linear transformation, a forward error correction code, an erasure code, and/or the like) on the original packet block to create the encoded packet. The process of generating encoded packets is known as network coding. The process of network coding is discussed in greater detail in "A digital fountain approach to reliable distribution of bulk data" by Byers et al. (ACM SIGCOMM Computer Communication Review, Volume 28, Issue 4, pp. 56-67, October 1998), the entire contents of which is hereby incorporated by reference.

The generation of the at least one encoded packet based on the quantity of encoded packets to generate is referred to as "adaptive network coding", because the quantity of encoded packets to generate is adapted based on factors such as the importance level and connection quality. By taking into account factors such as the importance level and connection quality, the resiliency of each data transmission to packet loss is dynamically adjusted to increase the quality of the video stream while minimizing bandwidth use and computational overhead. After block 310, the first exemplary embodiment 130a proceeds to block 312.

At block 312, the vehicle controller 14 generates an encoded packet block. In the scope of the present disclosure, the encoded packet block is a concatenation of the original packet block determined at block 302 with the at least one encoded packet generated at block 310. In other words, the encoded packet block includes the plurality of packets of the original packet block and the at least one encoded packet generated at block 310. After block 312, the first exemplary embodiment 130a is concluded and the method 100 proceeds to block 132. At block 132, the encoded packet block is transmitted to the remote server system 50 as discussed above. To recover the original data of the original packet block from the encoded packet block, the network transmission process at block 132 must not drop (i.e., fail to successfully transmit) more than the quantity of encoded packets determined at block 308 (e.g., ten). If less than the quantity of encoded packets determined at block 308 are dropped, the remote server system 50 and uses a decoding algorithm to solve a system of mathematical equations to reconstruct the original data of the original packet block.

Figure 4:
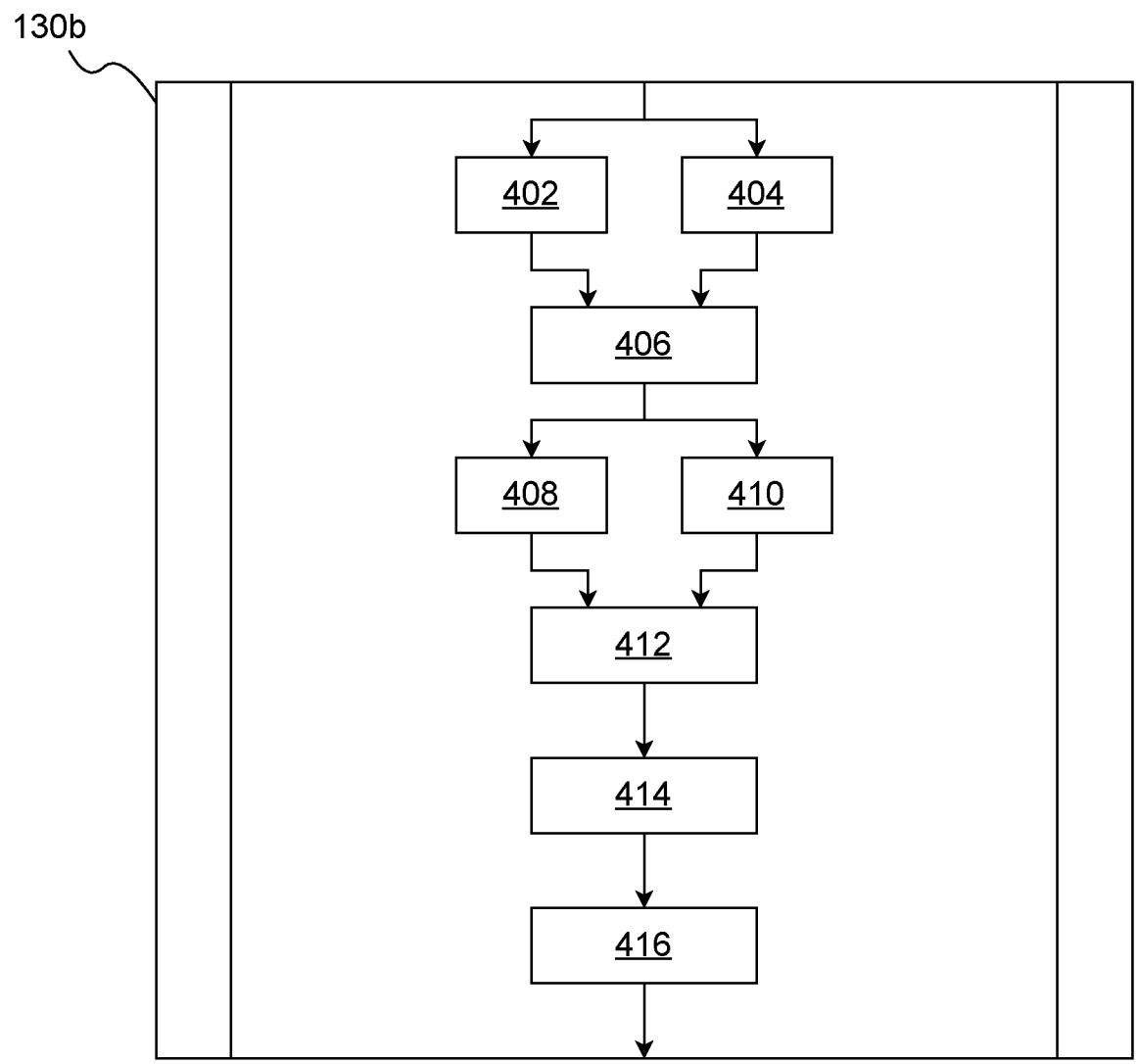
FIG. 4 is a flowchart of a method for adaptive network coding according to a first exemplary embodiment.

Referring to FIG. 4, a flowchart of a second exemplary embodiment 130b of block 130 is shown. The second exemplary embodiment 130b may be used when the at least one video frame captured at block 128 includes at least two groups of pictures (GOPs). In the scope of the present disclosure, a GOP is a collection of successive pictures within an encoded video stream. Each GOP includes at least one intra frame and at least one inter frame. The first of the at least two GOPs includes a first plurality of frames. The first plurality of frames includes at least one intra frame and at least one inter frame. The second of the at least two GOPs includes a second plurality of frames. The second plurality of frames includes at least one intra frame and at least one inter frame. The second exemplary embodiment 130b begins at blocks 402 and 404.

At block 402, the vehicle controller 14 generates a first plurality of packets from the first plurality of frames. The first plurality of packets encapsulates all frames of the first plurality of frames. In an exemplary embodiment, the data defining each of the first plurality of frames is divided into a plurality of sections, each of the plurality of sections being the payload of one of the first plurality of packets. After block 402, the second exemplary embodiment 130b proceeds to block 406.

At block 404 the vehicle controller 14 generates a second plurality of packets from the second plurality of frames. The second plurality of packets encapsulates the at least one intra frame of the second plurality of frames. In an exemplary embodiment, the data defining the at least one intra frame of the second plurality of frames is divided into a plurality of sections, each of the plurality of sections being the payload of one of the second plurality of packets. After block 404, the second exemplary embodiment 130b proceeds to block 406.

At block 406, the vehicle controller 14 generates a plurality of original packet blocks based on the first plurality of packets generated at block 402 and the second plurality of packets generated at block 404. In an exemplary embodiment, each of the plurality of original packet blocks includes at least one of the first plurality of packets generated at block 402 and at least one of the second plurality of packets generated at block 404. In an exemplary embodiment, each of the plurality of original packet blocks includes both data defining an entirety of one frame of the first GOP and data defining a portion of the at least one intra frame of the second GOP. Therefore, the at least one intra frame of the second GOP is "pre-fetched" and transmitted along with the data defining the first GOP. This pre-fetching method is used to reduce a waiting time that a receiver (i.e., the remote server system 50) must wait to receive the next intra frame, resulting in a smoother video stream. After block 406, the second exemplary embodiment 130b proceeds to blocks 408 and 410.

At block 408, the vehicle controller 14 determines an importance level of each of the plurality of original packet blocks generated at block 406. In an exemplary embodiment, the importance level is based, at least in part, on a frame type of the video frames defined by the data in each of the plurality of original packet blocks. Determination of the importance level is discussed in greater detail above in reference to block 304. After block 408, the second exemplary embodiment 130b proceeds to block 412.

At block 410, the vehicle controller 14 uses the vehicle communication system 18 to determine a connection quality of the connection between the vehicle communication system 18 of the system 10 and the server communication system 56 of the remote server system 50. Determination of the connection quality is discussed in greater detail above in reference to block 306. After block 410, the second exemplary embodiment 130b proceeds to block 412.

At block 412, the vehicle controller 14 determines a quantity of encoded packets to generate for each of the plurality of original packet blocks generated at block 406. In an exemplary embodiment, the quantity of encoded packets to generate is based at least in part on the importance level determined at block 408 and the connection quality determined at block 410. Determination of the quantity of encoded packets to generate is discussed in greater detail above in reference to block 308. After block 412, the second exemplary embodiment 130b proceeds to block 414.

At block 414, the vehicle controller 14 generates at least one encoded packet for each of the plurality of original packet blocks generated at block 406. The quantity of encoded packets to generate for each of the plurality of original packet blocks was determined at block 412. In an exemplary embodiment, each of the at least one encoded packets is generated by performing a mathematical operation (e.g., a linear transformation) on one of the plurality of original packet blocks to create the encoded packet. The process of generating encoded packets is known as network coding. The generation of encoded packets is discussed in greater detail above in reference to block 310. After block 414, the second exemplary embodiment 130b proceeds to block 416.

At block 416, the vehicle controller 14 generates a plurality of encoded packet blocks, each of the plurality of encoded packet blocks corresponding to one of the plurality of original packet blocks generated at block 406. In the scope of the present disclosure, the each of the plurality of encoded packet blocks is a concatenation of one of the plurality of original packet blocks determined at block 406 with the at least one encoded packet generated for the one of the plurality of original packet blocks at block 414. The generation of encoded packet blocks is discussed in greater detail above in reference to block 312. After block 416, the second exemplary embodiment 130b is concluded and the method 100 proceeds to block 132. At block 132, each of the plurality of encoded packet blocks is transmitted to the remote server system 50. In an exemplary embodiment, the remote server system 50 decodes each of the plurality of encoded packet blocks (as discussed above), identifies the at least one intra frame of the second GOP, and caches the at least one intra frame of the second GOP until the second GOP required (e.g., to stream/play-back the second GOP).

The system 10 and method 100 of the present disclosure offers several advantages. By accounting for the importance level of each frame and the connection quality, the number of encoded packets generated during network coding is adapted. Therefore, an error-resiliency of each frame is adapted based on the importance level and connection quality, allowing for a reduced error rate even with poor network conditions.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for real-time video streaming for a vehicle, the system comprising:
   a camera system configured to capture videos of an environment surrounding the vehicle;
   a vehicle communication system configured to communicate with a remote server; and
   a vehicle controller in electrical communication with the camera system and the vehicle communication system, wherein the vehicle controller is programmed to:
   determine a system enablement state, wherein the system enablement state includes a system enabled state and a system disabled state;
   determine a camera system configuration in response to determining that the system enablement state is the system enabled state;
   capture at least one video frame using the camera system based at least in part on the camera system configuration;
   generate at least one encoded packet block including the at least one video frame using network coding, wherein the at least one encoded packet block is generated based at least in part on an importance level of the at least one video frame; and
   transmit the at least one encoded packet block to the remote server using the vehicle communication system.

2. The system of claim 1, wherein to determine the system enablement state, the vehicle controller is further programmed to:
   identify an application mode of the system;
   determine at least one context; and
   determine the system enablement state based at least in part on the application mode and the at least one context.

3. The system of claim 2 further comprising a plurality of vehicle sensors, wherein the plurality of vehicle sensors is in electrical communication with the vehicle controller, and wherein to determine the at least one context, the vehicle controller is further programmed to:
retrieve mobile device context data from a mobile device using the vehicle communication system;
retrieve remote server context data from the remote server using the vehicle communication system;
retrieve vehicle sensor data from the plurality of vehicle sensors;
determine an occupant context based at least in part on the mobile device context data, the remote server context data, and the vehicle sensor data;
determine a vehicle context based at least in part on the mobile device context data, the remote server context data, and the vehicle sensor data; and
determine an environment context based at least in part on the mobile device context data, the remote server context data, and the vehicle sensor data.

4. The system of claim 2, wherein to determine the system enablement state, the vehicle controller is further programmed to:
determine the system enablement state using an enablement state lookup table, wherein the enablement state lookup table maps the at least one context to the system enablement state.

5. The system of claim 2, wherein to determine the camera system configuration, the vehicle controller is further programmed to:
determine an available bandwidth of a connection to the remote server using the vehicle communication system; and
determine the camera system configuration based at least in part on the available bandwidth and the application mode of the system, wherein the camera system configuration includes a selected camera, a camera resolution, a camera frame rate, and a camera compression rate.

6. The system of claim 1, wherein to generate the at least one encoded packet block, the vehicle controller is further programmed to:
encapsulate the at least one video frame in at least one original packet block, wherein the at least one original packet block includes a plurality of packets;
generate at least one encoded packet based on the plurality of packets in the at least one original packet block, wherein the at least one encoded packet is generated using network coding; and
generate the at least one encoded packet block, wherein the encoded packet block is a concatenation of the at least one original packet block and the at least one encoded packet.

7. The system of claim 6, wherein to generate the at least one encoded packet, the vehicle controller is further programmed to:
determine the importance level of the at least one video frame;
determine a quantity of encoded packets to generate based at least in part on the importance level of the at least one video frame; and
generate the quantity of encoded packets based on the plurality of packets in the at least one original packet block, wherein the quantity of encoded packets is generated using network coding.

8. The system of claim 7, wherein to determine the quantity of encoded packets to generate, the vehicle controller is further programmed to:

determine a connection quality of a connection to the remote server using the vehicle communication system; and
determine the quantity of encoded packets to generate based at least in part on the importance level of the at least one video frame and the connection quality.

9. The system of claim 6, wherein the at least one video frame includes at least two groups of pictures, wherein a first group of pictures of the at least two groups of pictures includes a first plurality of frames, wherein a second group of pictures of the at least two groups of pictures includes a second plurality of frames, and wherein to encapsulate the at least one video frame, the vehicle controller is further programmed to:
generate a plurality of original packet blocks, wherein each of the plurality of original packet blocks includes at least one of the first plurality of frames and at least one of the second plurality of frames.

10. The system of claim 9, wherein each of the first plurality of frames and second plurality of frames includes an intra frame and at least one inter frame, and wherein to generate the plurality of original packet blocks, the vehicle controller is further programmed to:
generate a first plurality of packets, wherein the first plurality of packets encapsulates the first plurality of frames;
generate a second plurality of packets, wherein the second plurality of packets encapsulates the intra frame of the second plurality of frames; and
generate the plurality of original packet blocks, wherein each of the plurality of original packet blocks includes at least one of the first plurality of packets and at least one of the second plurality of packets.

11. A method for real-time video streaming for a vehicle, the method comprising:
determining a system enablement state, wherein the system enablement state includes a system enabled state and a system disabled state;
determining a camera system configuration in response to determining that the system enablement state is the system enabled state;
capturing at least one video frame using a camera system based at least in part on the camera system configuration;
generating at least one encoded packet block including the at least one video frame using network coding, wherein the at least one encoded packet block is generated based at least in part on an importance level of the at least one video frame; and
transmitting the at least one encoded packet block to a remote server using a vehicle communication system.

12. The method of claim 11, wherein determining the system enablement state further comprises:
identifying an application mode of the system;
retrieving mobile device context data from a mobile device using the vehicle communication system;
retrieving remote server context data from the remote server using the vehicle communication system;
retrieving vehicle sensor data from a plurality of vehicle sensors;
determining an occupant context based at least in part on the mobile device context data, the remote server context data, and the vehicle sensor data;
determining a vehicle context based at least in part on the mobile device context data, the remote server context data, and the vehicle sensor data;

determining an environment context based at least in part on the mobile device context data, the remote server context data, and the vehicle sensor data; and determining the system enablement state based at least in part on the application mode, the occupant context, the vehicle context, and the environment context.

13. The method of claim 12, wherein determining the system enablement state further comprises:

determining the system enablement state using an enablement state lookup table, wherein the enablement state lookup table maps the application mode, the occupant context, the vehicle context, and the environment context to the system enablement state.

14. The method of claim 12, wherein determining the camera system configuration further comprises:

determining an available bandwidth of a connection to the remote server using the vehicle communication system; and determining the camera system configuration based at least in part on the available bandwidth and the application mode of the system, wherein the camera system configuration includes a selected camera, a camera resolution, a camera frame rate, and a camera compression rate.

15. The method of claim 11, wherein generating the at least one encoded packet block further comprises:

encapsulating the at least one video frame in at least one original packet block, wherein the at least one original packet block includes a plurality of packets;

generating at least one encoded packet based on the plurality of packets in the at least one original packet block, wherein the at least one encoded packet is generated using network coding; and generating the at least one encoded packet block, wherein the encoded packet block is a concatenation of the at least one original packet block and the at least one encoded packet.

16. The method of claim 15, wherein generating at least one encoded packet further comprises:

determining the importance level of the at least one video frame;

determining a connection quality of a connection to the remote server using the vehicle communication system;

determining a quantity of encoded packets to generate based at least in part on the importance level of the at least one video frame and the connection quality; and generating the quantity of encoded packets based on the plurality of packets in the original packet block, wherein the quantity of encoded packets is generated using network coding.

17. The method of claim 15, wherein the at least one video frame includes at least two groups of pictures, wherein a first group of pictures of the at least two groups of pictures includes a first plurality of frames, wherein a second group of pictures of the at least two groups of pictures includes a second plurality of frames, wherein each of the first plurality of frames and second plurality of frames includes an intra frame and at least one inter frame, and wherein encapsulating the at least one video frame further comprises:

generating a first plurality of packets, wherein the first plurality of packets encapsulates the first plurality of frames;

generating a second plurality of packets, wherein the second plurality of packets encapsulates the intra frame of the second plurality of frames; and generating a plurality of original packet blocks, wherein each of the plurality of original packet blocks includes at least one of the first plurality of packets and at least one of the second plurality of packets.

18. A system for real-time video streaming for a vehicle, the system comprising:

a camera system configured to capture videos of an environment surrounding the vehicle;

a vehicle communication system configured to communicate with a remote server; and a vehicle controller in electrical communication with the camera system and the vehicle communication system, wherein the vehicle controller is programmed to:

determine a system enablement state using an enablement state lookup table, wherein the enablement state lookup table maps an application mode of the system, an occupant context, a vehicle context, and an environment context to the system enablement state, and wherein the system enablement state includes a system enabled state and a system disabled state;

determine a connection quality of a connection to the remote server using the vehicle communication system;

determine a camera system configuration in response to determining that the system enablement state is the system enabled state, wherein the camera system configuration is based at least in part on the connection quality and the application mode of the system, and wherein the camera system configuration includes a selected camera, a camera resolution, a camera frame rate, and a camera compression rate;

capture at least one video frame using the camera system based at least in part on the camera system configuration;

encapsulate the at least one video frame in at least one original packet block, wherein the at least one original packet block includes a plurality of packets;

generate at least one encoded packet block, wherein the at least one encoded packet block is a concatenation of the at least one original packet block and a quantity of encoded packets generated using network coding, wherein the at least one encoded packet block is generated based at least in part on an importance level of the at least one video frame; and transmit the at least one encoded packet block to the remote server using the vehicle communication system.

19. The system of claim 18, wherein the quantity of encoded packets to be generated is determined based at least in part on the importance level of the at least one video frame and the connection quality of the connection to the remote server.

20. The system of claim 19, wherein the at least one video frame includes at least two groups of pictures, wherein a first group of pictures of the at least two groups of pictures includes a first plurality of frames, wherein a second group of pictures of the at least two groups of pictures includes a second plurality of frames, wherein each of the first plurality of frames and second plurality of frames includes an intra frame and at least one inter frame, and wherein to encapsulate the at least one video frame, the vehicle controller is further programmed to:

generate a first plurality of packets, wherein the first plurality of packets encapsulates the first plurality of frames;

generate a second plurality of packets, wherein the second plurality of packets encapsulates the intra frame of the second plurality of frames; and generate a plurality of original packet blocks, wherein each of the plurality of original packet blocks includes at least one of the first plurality of packets and at least one of the second plurality of packets.

* * * * *